(12) United States Patent
Waddell

(10) Patent No.: US 7,412,415 B2
(45) Date of Patent: Aug. 12, 2008

(54) PAIR TRADING SYSTEM AND METHOD

(75) Inventor: William Matthew Waddell, Rye, NY (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 10/206,549

(22) Filed: Jul. 25, 2002

(65) Prior Publication Data

US 2003/0130929 A1 Jul. 10, 2003

Related U.S. Application Data

(60) Provisional application No. 60/334,163, filed on Nov. 29, 2001.

(51) Int. Cl.
*G06Q 40/00* (2006.01)
(52) U.S. Cl. .......................................... 705/37; 705/36
(58) Field of Classification Search .................. 705/37, 705/36, 35, 30–34
See application file for complete search history.

(56) References Cited

U.S. PATENT DOCUMENTS

| | | | | |
|---|---|---|---|---|
| 5,101,353 | A | * 3/1992 | Lupien et al. ................. | 705/37 |
| 5,168,446 | A | * 12/1992 | Wiseman | |
| 5,243,331 | A | 9/1993 | McCausland et al. ........ | 345/172 |
| 5,774,880 | A | 6/1998 | Ginsberg ...................... | 705/36 |
| 5,852,811 | A | * 12/1998 | Atkins .......................... | 705/36 |
| 5,857,176 | A | * 1/1999 | Ginsberg ...................... | 705/36 |
| 6,112,189 | A | * 8/2000 | Richard et al. ................ | 705/37 |
| 6,272,474 | B1 | * 8/2001 | Garcia .......................... | 705/37 |
| 6,282,521 | B1 | * 8/2001 | Howorka ...................... | 705/37 |
| 6,317,727 | B1 | * 11/2001 | May .............................. | 705/37 |
| 6,321,212 | B1 | * 11/2001 | Lange ........................... | 705/37 |
| 6,421,653 | B1 | * 7/2002 | May .............................. | 705/37 |
| 2002/0161690 | A1 | 10/2002 | McCarthy et al. | |

OTHER PUBLICATIONS

Ruggiero, Murray A. Jr.; Equity futures: Trades site in this bold new market; Futures; v30; n1; pp. 58-61; Sep. 2001.*
Financial Times; Japan ed.; 'Spiders' and 'vipers' find favourin the equity jungle; Section: Global Investment Fund Managemen; Apr. 7, 2002.*
Spiro, L. et al., It wasn't just the bond market that LTCM endangered, Business week, Nov. 9, 1998, No. 3603, p. 160.*
John Downes, Dictionary of Finance and Investment Terms, 1998, Barron's Educational Series Inc, Fifth Edition, pp. 328, 526.*
"GIB wins European Hedge Fund Award", *Emerging Markets Daftafile, Bahrain Tribune*, Jun. 12, 2001.
J. Chernoff, "Hedge fund strategies may be time bombs; Short tenures tend to inflate Sharpes", *Investment News*, pp. 24May 14, 2001.

(Continued)

*Primary Examiner*—Frantzy Poinvil
(74) *Attorney, Agent, or Firm*—Clifford Chance US LLP

(57) ABSTRACT

A method is provided for fulfilling a pair trade request and includes the steps of receiving a plurality of pair trade requests; executing a transaction for a first portion of one of the plurality of pair trade requests and matching a second portion of the one of the plurality of pair trade requests against another of the plurality of pair trade requests.

46 Claims, 5 Drawing Sheets

OTHER PUBLICATIONS

M. O'Brien, "Brent Nyitray and Daniel Morgan Join Bear Stearns Relative Value Desk", *Business Wire*, Jan. 25, 2001.

M. Fischer, "Conservative, value-focused approach to asset allocation", *MAR/Hedge*, Fund of Funds Review; No. 76; pp. 22, Apr. 2000.

A. Capon, "Beyond the price imperative", *International Securities Lending Fourth Quarter 1999*, pp. 12-22; ISSN: 09649301, Fourth Quarter 1999.

J. Ogden, "HSBC set to blaze alternative trail to fund investment; HSBC hedges bets in new trend", *South China Morning Post*, Sunday Money; pp. 10, Jul. 11, 1999.

L. Spiro et al., "It wasn't just the bond market that LTCM endangered", *Business Week*, Finance; Hedge Funds; No. 3603; pp. 160, Nov. 9, 1998.

H. Rossman, "Alternative strategies: Risks, rewards and considerations", *Trusts & Estates*, vol. 134n5, pp. 32-40, May 1995.

J. Newman, "Long and Short of CFD (contracts for difference)", *Money Marketing*, vol. 64, Nov. 9, 2000.

M. Garvey et al., :"How brokers facilitate trade for long-term clients in competitive securities markets"., *Journal of Business*, vol. 68, n1, p1(33), Jan. 1995.

"Canadian Quantex User Manual", *RBC Dominion Securities Inc.*, vol. 1: Trade Execution, 1992.

Int'l Search Report for PCT/US02/37922 dated Mar. 27, 2003.

\* cited by examiner

PAIR TRADING SYSTEM AND METHOD

CROSS-REFERENCE TO RELATED APPLICATION

This application claims the benefit of the filing date of U.S. provisional application Ser. No. 60/334,163 entitled "Method and System for Trading Pairs of Securities," that was filed on Nov. 29, 2001, the contents of which are incorporated by reference herein.

BACKGROUND

The following invention relates to a system and method for trading securities and, in particular, for a system and method of trading securities in pairs.

A recognized strategy for trading securities is known as pair-trading. Pair-trading is a non-directional investment strategy in which the investor identifies two securities having similar characteristics and the securities are currently trading at a price relationship that is out of their historical trading range. The investor exploits the price relationship between the securities by buying the undervalued security while short-selling the overvalued security. Because pair-trading is a market-neutral strategy, it is a particularly desirable strategy for investing in volatile markets.

One context in which pair trading is useful is where an investor desires to take advantage of an arbitrage opportunity resulting from a merger between two companies. For example, Company A has announced a definitive agreement to acquire Company T in which case Company T shareholders will receive 0.5 shares of Company A stock for each share of Company T stock they own. The investor desires to capture the "spread" between the offered consideration (0.5 shares of A) and the price of T stock. To do this, the investor buys shares in T stock and sells shares of A stock.

For instance, if stock T is trading at $28 per share and stock A is trading at $60 per share, then the investor may execute a trade for 200,000 spreads by buying 200,000 shares of T stock and selling 100,000 shares of A stock. After the merger takes place, the investor will cover the short position in stock A with the 100,000 shares of A stock the investors receives in exchange of the 200,000 shares the investor held of stock T. Thus, by executing the pair trade, the investor locks in a $400,000 profit (assuming that the merger goes through). The process of executing a pair trade thus includes executing individual trades directed to each leg of the pair trade request. An example of a system for executing trades for filling a pair trade request is the Quantex system from ITG [(http://www.itginc.comproducts/quantex/quantex.html)] of 380 Madison Avenue New York, N.Y. 10017.

A challenge in implementing a pair trade is to find a counterparty for a particular position an investor desires to establish while minimizing "leg risk." Typically, a large pair trade is performed "off the market" as a private transaction negotiated by a financial institution that services large clients. For example, if an investor desires to execute a pair trade betting that a proposed merger between two companies will go through, the investor would approach a financial institution seeking an investor that is willing to bet against the merger. The financial institution then acts as an intermediary between the two investors in which the investors establish equal and opposite positions in the stock of the proposed merger partners thereby completing the pair trade. Thus by matching two pair trade requests so that the transactions associated with each of the pair trade legs are executed simultaneously, neither investor is exposed to leg risk that would otherwise result for the period of time between execution of the first leg and the second leg of the pair trade.

There are numerous drawbacks associated with the prevalent pair-trading practice. First, pair-trading is typically limited to clients of large financial institutions that have the ability to identify suitable counterparties for a particular pair trade. This is especially the case when the pair trade involves a large amount of stock or illiquid stocks in which the only way to execute the trade and minimize leg risk is via an "off the market" transaction negotiated by a financial institution. Also, because a pair-trade is typically negotiated by the parties with a financial institution as an intermediary, the process is often slow and inefficient. Furthermore, pair-trading under current practice is generally best suited for large clients seeking to establish large positions thereby providing the financial institutions with the economic incentive to execute the transaction. Smaller clients, however, must rely on the markets for executing pair trades, which is unsuitable for illiquid stocks and also results in increased leg risk.

Accordingly, it is desirable to provide a system and method for trading securities in pairs.

SUMMARY OF THE INVENTION

The present invention is directed to overcoming the drawbacks of the prior art pair trading practices. Under the present invention a method is provided for fulfilling a pair trade request and includes the steps of receiving a plurality of pair trade requests; executing a transaction for a first portion of one of the plurality of pair trade requests and matching a second portion of the one of the plurality of pair trade requests against another of the plurality of pair trade requests.

In an exemplary embodiment, the method includes the step of executing a transaction for a first portion of one of the plurality of pair trade requests in an external market.

In another exemplary embodiment, the method includes the step of executing a transaction for a first portion of one of the plurality of pair trade requests against the order inventory.

In yet another exemplary embodiment, the pair trade request includes a first security having a bid price and an ask price and a second security having a bid price and an ask price, and the method includes the steps of determining whether the bid price of the first security and the bid price of the second security meet a spread limit; determining an amount of the second security that can be sold based on a bid size associated with the second security; calculating an equivalent amount of the first security that can be bought based on the amount of the second security that can be sold; adjusting the equivalent amount of the first security based on adjustment criteria; calculating a purchase price for the adjusted equivalent amount of the first security based on the spread limit; executing an initiating order to buy the adjusted equivalent amount of the first security at the purchase price and executing a covering order to sell the amount of the second security.

In still yet another exemplary embodiment, the method includes the step of executing a covering order to sell the amount of the second security at the bid price of the second security.

In an exemplary embodiment, the method includes the steps of determining whether the ask price of the first security and the ask price of the second security and/or the bid price of the first security and the bid price of the second security meet a spread limit; determining an amount of the first security that can be bought based on an offer size associated with the first security; calculating an equivalent amount of the second security that can be sold based on the amount of the second security that can be bought; adjusting the equivalent amount of the second security based on adjustment criteria; calculating a selling price for the adjusted equivalent amount of the second security based on the spread limit; executing an initiating order to sell the adjusted equivalent amount of the second security at the selling price and executing a covering order to purchase the amount of the first security.

In another exemplary embodiment, the method includes the step of executing a covering order to purchase the amount of the first security at the ask price of the first security.

In yet another exemplary embodiment, the adjustment criteria include a minimum amount and a maximum amount.

In still yet another exemplary embodiment, the method includes the step of rounding the initiating order to a round lot size.

In an exemplary embodiment, the method includes the step of executing a first portion of one of the plurality of pair trade requests in a plurality of tranches.

In another exemplary embodiment, the one of the plurality of pair trade requests and the another of the plurality of pair trade requests include a first security and a second security, the one of the plurality of pair trade requests has a first spread limit and the another of said plurality of trade requests has a second spread limit and wherein the method includes the steps of determining that a range of the first spread limit and the second spread limit overlaps with a market spread; setting a spread level; calculating prices for the first security and the second security that are within the market spread and based on the spread level and matching the second portion of the one of the plurality of pair trade requests against another of the plurality of pair trade requests based on the calculated prices.

In yet another exemplary embodiment, the method includes the steps of calculating a mean between the first spread limit and the second spread limit and setting the spread level as the mean if the mean is within the market spread.

In still yet another exemplary embodiment, the method includes the step of identifying a spread amount that is closest to the mean and within the market spread and setting the spread level as the spread amount if the mean is not within the market spread.

In an exemplary embodiment, the one of the plurality of pair trade requests and the another of the plurality of pair trade requests include a first security and a second security, the one of the plurality of pair trade requests has a first spread limit, a buy ratio and a sell ratio, the another of the plurality of trade requests has a second spread limit, a buy ratio and a sell ratio and the method includes the steps of determining that the buy ratio and the sell ratio associated with the one of the plurality of trade requests does not equal the buy ratio and the sell ratio of the another of the plurality of trade requests and that an overlap exists between range of the first spread limit and the second spread limit and a market spread; determining that market prices exist that are within the overlap; determining a mismatch amount in the second security based on a difference between the buy ratio and the sell ratio associated with the one of the plurality of trade requests and the buy ratio and the sell ratio of the another of the plurality of trade requests; calculating a cross amount for the first security and the second security; selecting a crossing price for the first security and the second security that is within the overlap; determining that the mismatch amount is available at the crossing price for the second security; matching the second portion of the one of the plurality of pair trade requests against another of the plurality of pair trade requests based on the calculated prices and executing a transaction for the mismatch amount of the second security at the crossing price for the second security.

In another exemplary embodiment, the method includes the step of determining that the mismatch amount is available in an external market at the crossing price for the second security.

In yet another exemplary embodiment, the method is performed by a financial institution having order inventory and includes the step of determining that the mismatch amount is available in the order inventory at the crossing price for the second security.

In still yet another exemplary embodiment, the one of the plurality of pair trade requests and the another of the plurality of pair trade requests indicate a number of spreads and the method includes the step of matching a second portion of the one of the plurality of pair trade requests against another of the plurality of pair trade requests if the number of spreads is greater than a minimum number of spreads.

In an exemplary embodiment, the method includes the step of receiving a preference for filling at least some of the plurality of trade requests via the step of executing a transaction for a first portion of one of the plurality of pair trade requests, described above.

In another exemplary embodiment, the method includes the step of receiving a preference for filling at least some of the plurality of trade requests via the step of matching a second portion of the one of the plurality of pair trade requests against another of the plurality of pair trade requests, described above.

Under the present invention, a method for fulfilling a pair trade request is provided and includes the steps of receiving a plurality of pair trade requests and matching at least a portion of one of the plurality of pair trade requests against another of the plurality of pair trade requests.

Under the present invention, a system for fulfilling a pair trade request is provided, the system receiving a plurality of pair trade requests and includes a pair trading engine for executing a transaction for a first portion of one of the plurality of pair trade requests. The system also includes a pair crossing network for matching a second portion of said one of the plurality of pair trade requests against another of the plurality of pair trade requests.

In an exemplary embodiment, the system includes a link to external markets and wherein the pair trading engine executes the transaction for the first portion of one of the plurality of pair trade requests in the external markets.

In another exemplary embodiment, the system includes a financial institution having an order inventory and wherein the pair trading engine executes the transaction for the first portion of one of the plurality of pair trade requests against the order inventory.

In yet another exemplary embodiment, the pair trade request includes a first security having a bid price and an ask price and a second security having a bid price and an ask price, and wherein the pair trading engine determines whether the bid price of the first security and the bid price of the second security meet a spread limit; determines an amount of the second security that can be sold based on a bid size associated with the second security; calculates an equivalent amount of the first security that can be bought based on the amount of the second security that can be sold; adjusts the equivalent amount of the first security based on adjustment criteria; calculates a purchase price for the adjusted equivalent amount of the first security based on the spread limit; executes an initiating order to buy said adjusted equivalent amount of the first security at the purchase price and executes a covering order to sell the amount of the second security.

In still yet another exemplary embodiment, the pair trading engine executes a covering order to sell the amount of the second security at the bid price of the second security.

In an exemplary embodiment, the pair trading engine determines whether the ask price of the first security and the ask price of the second security meet a spread limit; determines an amount of the first security that can be bought based on an offer size associated with the first security; calculates an equivalent amount of the second security that can be sold based on the amount of the second security that can be bought; adjusts said equivalent amount of the second security based on adjustment criteria; calculates a selling price for the adjusted equivalent amount of the second security based on the spread limit; executes an initiating order to sell the adjusted equivalent amount of the second security at the selling price; and executes a covering order to purchase the amount of the first security.

In another exemplary embodiment, the pair trading engine executes a covering order to purchase the amount of the first security at the ask price of the first security.

In yet another exemplary embodiment, the pair trading engine rounds the initiating order to a round lot size.

In still yet another exemplary embodiment, the pair trading engine executes a first portion of one of the plurality of pair trade requests in a plurality of tranches.

In an exemplary embodiment, the one of the plurality of pair trade requests and the another of the plurality of pair trade requests include a first security and a second security, the one of the plurality of pair trade requests has a first spread limit and the another of the plurality of trade requests has a second spread limit and wherein the pair crossing network determines that a range of the first spread limit and the second spread limit overlaps with a market spread; sets a spread level; calculates prices for the first security and the second security that are within the market spread and based on the spread level; and matches the second portion of said one of the plurality of pair trade requests against another of the plurality of pair trade requests based on the calculated prices.

In another exemplary embodiment, the pair crossing network calculates a mean between the first spread limit and the second spread limit and sets the spread level as the mean if the mean is within the market spread.

In yet another exemplary embodiment, the pair crossing network identifies a spread amount that is closest to the mean and within the market spread and sets the spread level as the spread amount if the mean is not within the market spread.

In still yet another exemplary embodiment, the one of said plurality of pair trade requests and the another of the plurality of pair trade requests include a first security and a second security, the one of the plurality of pair trade requests has a first spread limit, a buy ratio and a sell ratio, the another of the plurality of trade requests has a second spread limit, a buy ratio and a sell ratio and wherein the pair crossing network determines that the buy ratio and the sell ratio associated with the one of the plurality of trade requests does not equal the buy ratio and the sell ratio of the another of the plurality of trade requests and that an overlap exists between range of the first spread limit and the second spread limit and a market spread; determines that market prices exist that are within the overlap; determines a mismatch amount in the second security based on a difference between the buy ratio and the sell ratio associated with the one of the plurality of trade requests and the buy ratio and the sell ratio of the another of the plurality of trade requests; calculates a cross amount for the first security and the second security; selects a crossing price for the first security and the second security that is within said overlap; determines that the mismatch amount is available at the crossing price for the second security; matches the second portion of the one of the plurality of pair trade requests against another of the plurality of pair trade requests based on the calculated prices; and executes a transaction for the mismatch amount of the second security at the crossing price for the second security.

In an exemplary embodiment, the pair crossing network determines that the mismatch amount is available in an external market at the crossing price for the second security.

In another exemplary embodiment, the pair crossing network determines that the mismatch amount is available in the order inventory at the crossing price for the second security.

In yet another exemplary embodiment, the one of said plurality of pair trade requests and the another of the plurality of pair trade requests indicate a number of spreads and wherein the pair crossing network matches a second portion of the one of the plurality of pair trade requests against another of the plurality of pair trade requests if the number of spreads is greater than a minimum number of spreads.

In still yet another exemplary embodiment, the plurality of pair trade requests include at least some pair trade requests indicating a preference for execution via said pair crossing network, and the system further includes a portfolio manager in communications with the pair crossing network, the portfolio manager receiving the plurality of pair trade requests and routing the at least some pair trade requests to the pair crossing network according to the preference.

In an exemplary embodiment, the system includes a pair trading engine for executing at least some of the plurality of pair trade requests, further includes a portfolio manager in communications with the pair trading engine and wherein the plurality of pair trade requests include at least some pair trade requests indicating a preference for execution via the pair trading engine, the portfolio manager receiving the plurality of pair trade requests and routing the at least some of the plurality of trade requests to the pair trading engine according to the preference.

Under the present invention, a system for fulfilling a pair trade request is provided, wherein the system receives a plurality of pair trade requests and includes a pair crossing network for matching at least one of the plurality of pair trade requests against another of the plurality of pair trade requests.

Accordingly, a method and a system are provided for trading pair securities.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
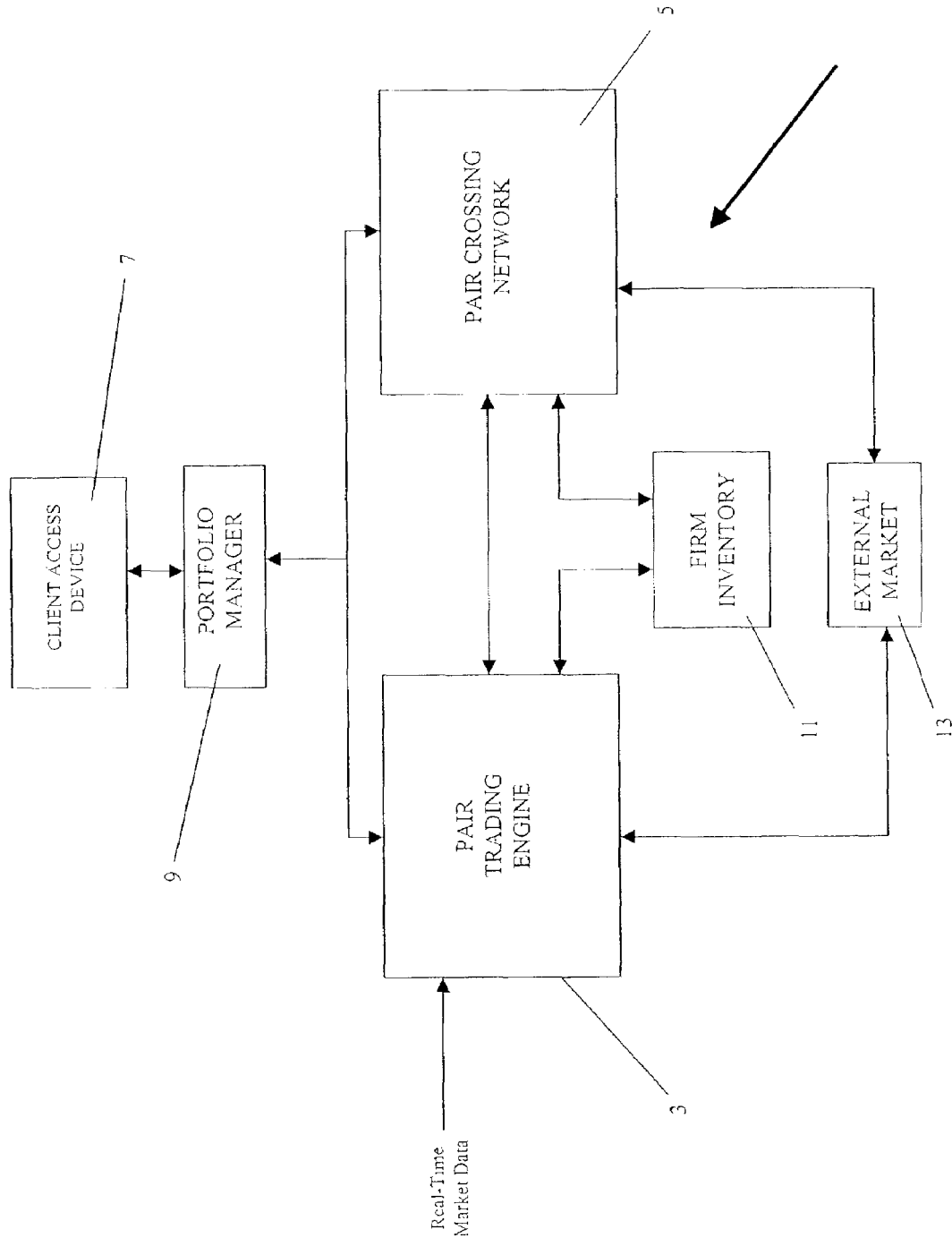
FIG. 1 is a block diagram of a system for trading securities in pairs according to the present invention.

Referring now to FIG. 1, there is shown a block diagram of a system 1 for trading securities in pairs according to the present invention. System 1 receives pair trade requests from clients operating client access devices 7 and attempts to fill the pair trade requests according to the parameters associated with the particular pair trade request. System 1 includes two different subsystems for filling pair trade requests: a pair trading engine 3 and a pair crossing network 5. As will be described below, pair trading engine 3 receives a pair trade request and attempts to fill (in whole or in part) the trade request by executing the appropriate trades in an external market 13 (that may include, by way of non-limiting example, the New York Stock Exchange, the NASDAQ or any other financial market). Pair trading engine 3 may also fill (in whole or in part) a pair trade request by executing a transaction against order inventory 11 of (non-pair) trade requests controlled by the financial institution that is operating system 1. In addition, pair trading engine may also fill (in whole or in part) a pair trade request by forwarding the trade request to pair crossing network 5 for matching with other pair trade requests.

Likewise, pair crossing network 5 receives a pair trade request and fulfills (in whole or in part) the request by matching it against another pair trade request received by pair crossing network 5, by matching the request against inventory 11 controlled by the financial institution and/or by forwarding the trade request to pair trading engine 3 for execution in external markets 13.

System 1 also includes a portfolio manager 9 (that may be, for example, a software program executing on a computer system) that receives the pair trade requests from client access device 7 and presents the trade request to either pair trading engine 3, pair crossing network 5 or both, depending on the trade parameters set by the client. Also, the client may query portfolio manager 9 regarding the status of any pair trade request the client has presented to system 1.

In operation, system 1 may fulfill a pair trade request either using pair trading engine 3, or pair crossing network 5, or a combination of the two. For example, a pair trade request received by system 1 may be completely filled by pair trading engine 3 as follows.

Assume a case where XYZ is taking over ABC and is offering 0.575 shares of XYZ for each ABC share and investor Arb wants to invest in the price difference between ABC stock and XYZ stock. To take advantage of the price difference, Arb wants to lock in the difference between the value offered (0.575*XYZ stock) and the value of ABC stock by buying ABC stock and selling XYZ stock subject to the condition that ABC−0.575 XYZ<=−$1.19 (i.e., Arb desires to capture a $1.19 difference between XYZ's takeover offer and ABC's share price).

In order to fill this pair trade, Arb presents a pair trade request to portfolio manager 9 (using client access device 7). The pair trade request typically includes a number of parameters that define the pair trade and that also may be used by portfolio manager 9 in determining how the pair trade request is to be filled. Arb typically indicates in the trade request the number of spreads the Arb desires to invest in and also provides a minimum and maximum share amount that he is willing to trade per tranche.

For example, Arb may indicate a desire to invest in 100,000 spreads and may only wish to trade the spread 3,000-8,000 shares at a time. Arb generally sets this tranche size range based on the liquidity and volatility of ABC stock and XYZ stock. Arb may set a larger minimum tranche size if ABC stock and XYZ stock are fairly liquid stocks because higher liquidity increases the likelihood that a larger tranche size will be executed. Arb may set a lower maximum tranche size if XYZ stock and ABC stock are volatile stocks so as to limit the "leg risk" associated with executing a pair trade.

Yet another pair trade parameter Arb provides is the spread limit (in the above case −1.19) which is the amount Arb desires to capture in the trade. Arb does not have to provide, however, the discrete prices at which trades for ABC and XYZ stock are to be executed as these prices are calculated by pair trading engine 3 (and/or pair crossing network 5), as will be described below.

Figure 2:
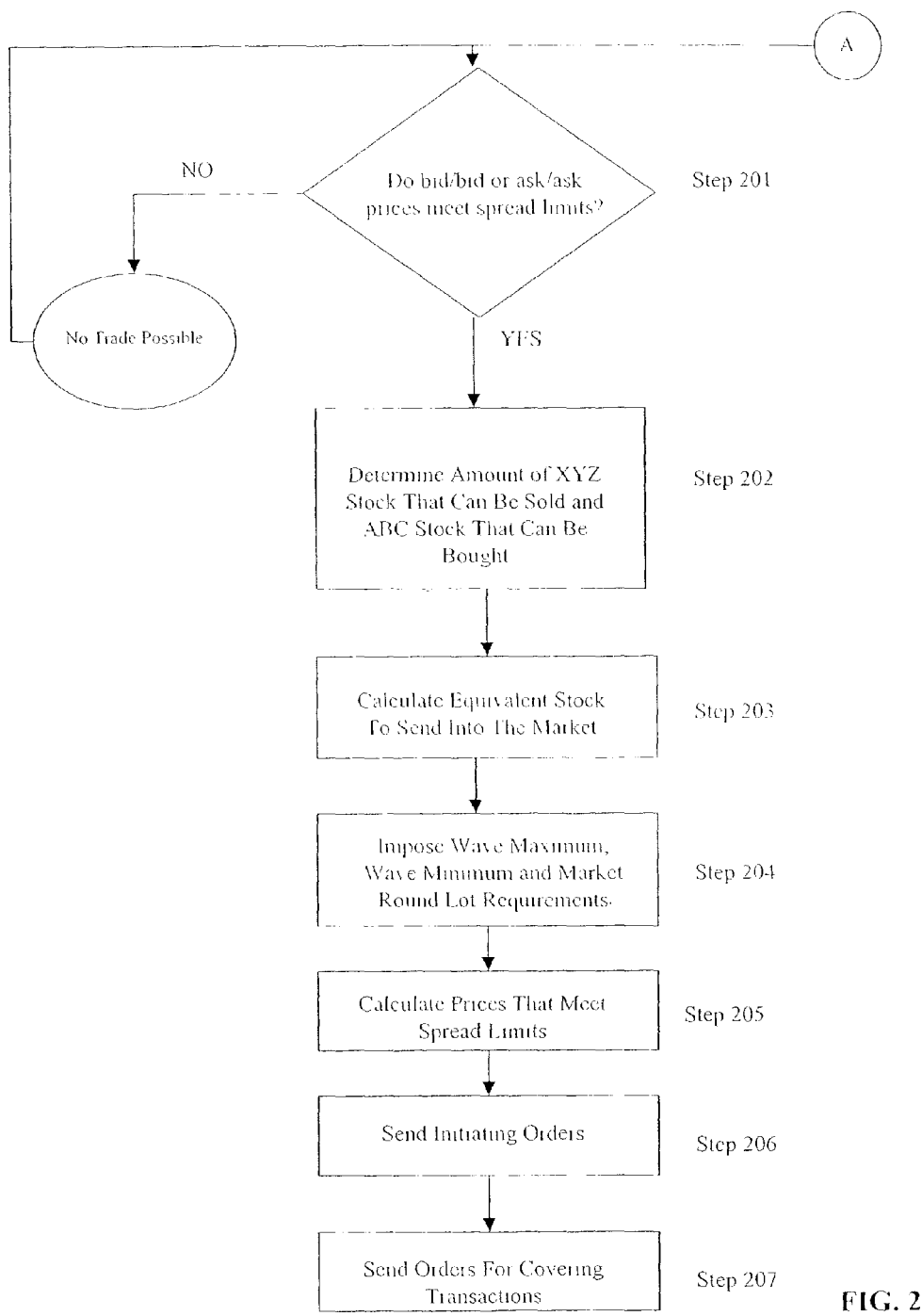
FIG. 2 is a flowchart of the steps a pair trading engine included in the system of FIG. 1 applies to fill a pair trade request.

Referring now to FIG. 2, there is shown a flowchart describing the steps pair trading engine 3 applies to fill a pair trade request. The flowchart in FIG. 2 is based on the above example and the market data listed in Table 1 below.

TABLE 1

|  | Ratio | Bid Size | Bid Price | Ask Price | Ask Size |
|---|---|---|---|---|---|
| ABC: | 1 | 7,500 | 69 | 69.3125 | 1,500 |
| XYZ | 0.575 | 10,000 | 122 50 | 122 625 | 200 |
| XYZ Ratio-Adjusted Value |  |  | 70.4375 | 70.5094 |  |
| Dollar Spread |  |  | Bid:Bid −1.4375 | Ask:Ask −1.1969 |  |

Initially, in Step 201, pair trading engine 3 determines whether the bid/bid prices or ask/ask prices of ABC and XYZ stock, respectively, meet the spread limit requirement of the particular pair trade request. In this case the bid/bid spread is −1.4375((122.50*0.575)−69) and the ask/ask spread is −1.1969 ((122.625*0.575)−69.3125) so that each spread is less than the spread limit of −1.19, as is required for this particular trade. Once it is determined that either the bid/bid spread or the ask/ask spread meets the spread limit, then in Step 202, it is determined (as is indicated in Table 1) how much XYZ stock can be sold at the bid and how much ABC stock can be bought at the ask. In an exemplary embodiment, the client may specify whether the bid/bid spread, the ask/ask spread or either the bid/bid or the ask/ask spread must exceed the indicated spread limit for a transaction to proceed. If neither the bid/bid spread nor the ask/ask spread meets the spread limit, the process waits a period of time (for example 0.10 seconds) and returns to Step 201 to again test whether the bid/bid spread or the ask/ask spread meets the spread limit.

Next, in step 203, an equivalent amount of stock that can be sent into the market (i.e., bought/sold in the market) is calculated for a spread based on the bid/bid price spread and/or the ask/ask price spread that meets the spread limit. In this example, if a maximum of 10,000 shares of XYZ stock can be sold into the market (i.e., the XYZ bid size) then, based on the ABC:XYZ ratio (of 1:0.575 in this case), a total of 17,391 (10,000/0.575) shares of ABC stock are to be bought in order to execute a balanced pair trade. Likewise, if a maximum of 1,500 shares of ABC stock can be bought in the market (i.e., the ABC ask size), then, based on the ABC:XYZ ratio (of 1:0.575 in this case), a total of 863 (1500×0.575) shares of XYZ stock are to be sold in order to execute a balanced pair trade.

Next, in Step 204, the pair trade share amounts calculated in Step 203 are adjusted to conform to the wave maximum and minimum parameters (i.e., the maximum/minimum tranche size) included in the pair trade request as well as market round lot limits. In the above example, the amount of ABC shares to be bought that was calculated based on the XYZ bid size (i.e., 17,391) is first rounded to an even lot size (i.e., 17,400) and then reduced to the maximum tranche size of 8000. Also, the amount of XYZ shares to be offered that was calculated based on the ABC ask size (i.e., 863) is first rounded to an even lot size (i.e., 900) and then increased to 1,700 shares to meet the minimum tranche size of 3000 (3000×0.575=1777). In an exemplary embodiment the minimum and maximum tranche size is scaled by the particular ratio (for example, in the above case, the tranche sizes for XYZ stock is scaled by 0.575). In another embodiment, the maximum/minimum tranche size is used for each security in the pair trade request without scaling. In yet another exemplary embodiment, the pair trade request includes a separate maximum/minimum tranche for each security.

Once the share amounts for the pair trade are calculated, in Step 205, the share prices that are needed to meet the spread limit of the pair trade request are calculated. For example, for a pair trade based on the bid/bid price spread, in order to meet the spread limit of $1.19 credit, the price at which ABC stock the initiating order the price of XYZ stock dips to $122.49 (in which case the spread limit of the pair trade would drop to 1.18), then pair trading engine 3 would still sell XYZ stock at the price of $122.49 if the $0.01 difference was within the threshold amount included in the pair trade request. Similarly, the pair trade request may include threshold amounts for any other pair trade parameter, including by way of non-limiting example, the number of spreads to be purchased and the tranche sizes. If, however, a particular threshold amount indicated by the client is exceeded for any given pair trade parameter, then pair trading engine 3 would attempt to cancel the initiating order and/or the covering order (that may be possible if the orders have not yet reached the market or have not yet been filled). In such a case, pair trading engine 3 would then repeat the above analysis for determining suitable initiating and cover orders.

To fill a pair trade request, pair trading engine 3 executes trades utilizing the method described above. Typically, pair trading engine 3 tranches a pair trade request and trades piece-meal in external markets 13. In certain cases, however, it may be difficult to fill a trade request by executing several transactions in external markets 13 either because the pair trade request is for a very large number of spreads or includes stocks that are illiquid (in which cases pair trading engine 3 may be ineffective in filling the pair trade request). Also, in certain situations, a client wishing to remain anonymous may indicate in the pair trade request a preference that no orders be sent to external markets 13. In these circumstances, portfolio manager 9 may route the particular pair trade request to pair crossing network 5.

Figure 3:
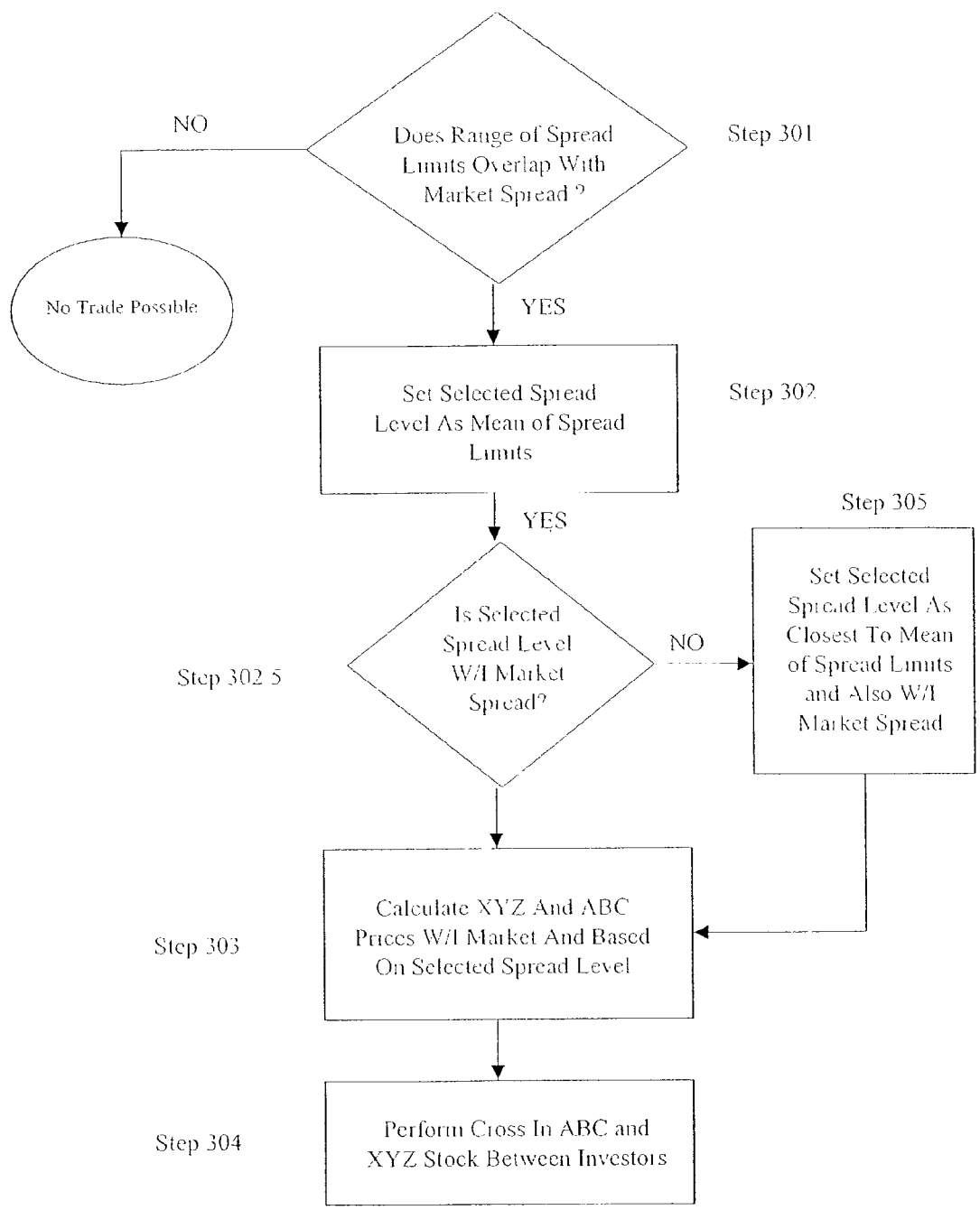
FIG. 3 is a flowchart of the steps a pair crossing network included in the system of FIG. 1 applies to fill a pair trade request.

Referring now to FIG. 3, there is shown a flowchart illustrating the steps pair crossing network 5 applies to fill a pair trade request. The flowchart in FIG. 3 is based on the above example and the market data listed in Table 2 below.

TABLE 2

| Investor | Action | Ticker | Ratio | Shares | Action 2 | Ticker | Ratio | Shares | Spread Limit* |
|---|---|---|---|---|---|---|---|---|---|
| Arb | Buy | ABC | 1 | 50,000 | Sell | XYZ | 0.575 | 28,800 | 1.19 credit |
| Antiarb | Sell | ABC | 1 | 30,000 | Buy | XYZ | 0.575 | 17,200 | 1.30 debit |

*Spread Limit as defined by [0.575 XYZ - ABC]

is to be bid should be no greater than $69.2475 ((122.50× 0.575)–1.19) a share. Likewise, for a pair trade based on the ask/ask price spread, in order to meet the spread limit, the price at which XYZ stock is to be offered should be greater than or equal to $122.6130 ((69.3125+1.19)/0.575) a share.

Next, once the pair trade share amounts and share prices have been calculated, in Step 206, pair trading engine 3 sends "initiating" orders to external markets 13 in order to fill the pair trade request. The initiating orders may include an initiating order for executing a pair trade based on the bid/bid spread (in this case a bid for 8,000 shares of ABC stock at $69.2475) and/or an initiating order for executing a pair trade based on the ask/ask spread (in this case an offer of 1,700 shares of XYZ stock at $122.6130).

Finally, as the initiating orders sent to external markets 13 in Step 207 get filled, pair trading engine 3 automatically sends into the market the covering side of the pair trade. So, for example, as the initiating order of buying 8,000 shares of ABC stock at $69.2475 gets filled, pair trading engine 3 sends an order to external markets 13 to sell 4,600 (8,000×0.575) shares of XYZ stock at $122.50.

In an exemplary embodiment, the client's pair trade request includes threshold amounts that indicate the amount of variance in stock price and/or share amount the client is willing to absorb. For example, if in the process of covering Continuing the previous example, assume the pair trade request issued by Arb for 100,000 spreads was half-filled by pair trading engine 3. Also, assume that system 1 receives a pair trade request from Antiarb that indicates a desire to sell 30,000 shares of ABC and buy 17,200 shares (a ratio of 1:0.575) and also indicates a spread limit of 1.30 (i.e., (ABC– 0.575XYZ)<=$1.30). In this case Arb and Antiarb's orders are complimentary in the primary order elements—securities, ratios and buy versus sell. Also, Antiarb is willing to pay $0.11 per spread more than Arb is demanding from the marketplace. Based on these parameters, there is an opportunity for Arb's and Antiarb's trade requests to be filled via pair crossing network 5.

If Antiarb's pair trade request was marked for trading by pair trading engine 3, then portfolio manager 9 sends Antiarb's order to pair trading engine 3 for execution. Pair trading engine 3 then sends the parameters of Antiarb's trade request, as well as all orders waiting for execution in pair trading engine 3, to pair crossing network 5. Pair crossing network 5 will recognize (as described above) that there is a crossing opportunity between Arb's order and Antiarb's order. In this case, pair crossing network 5 then directs pair trading engine 3 to suspend the execution of Antiarb's order in the amount that can be crossed by pair crossing network 5 (30,000 spreads in this case). In addition, pair trading engine 3 routes a cross amount of 30,000 spreads from Arb's order to pair crossing network 5 for crossing against Antiarb's order. At this point, the pair crossing network 5 crosses the Antiarb order against a portion of Arb's order, as follows.

Assume the prevailing market conditions at the time of the cross are as shown in Table 3. Furthermore, Table 3 indicates the XYZ Ratio-Adjusted Value for both the bid and ask prices based on the conversion ratio of 1:0.575. Based on the XYZ Ratio-Adjusted Values, a Bid:Ask Spread Range (i.e., the spread provided for a cross between the bid price of ABC stock and the XYZ Ratio-Adjusted ask price) of −1.3863 is calculated and an Ask:Bid Spread Range (i.e., the spread provided for a cross between the ask price of ABC stock and the XYZ Ratio-Adjusted bid price) of −1.05 is calculated.

If it is determined in Step 302 that the mean of Arb's and Antiarb's spread order limits does not fall within the range of the market spread, then in Step 305, the spread closest to the mean of the two spread limits that is also within the market spread is calculated. For example, if the market spread is $1.3863-$1.28, then the mean of the two spread limits ($1.245) is not within the market spread. In such a case, $1.28 is selected as the spread level that is closest to the mean and within the market spread. In an exemplary embodiment, the spread level at which Arb and Antiarb cross can be determined in any other suitable manner as long as the spread level is within the market spread and within the range of spread limits indicated in the pair trade requests.

TABLE 3

|  | Ratio | Bid Size | Bid Price | Ask Price | Ask Size |
|---|---|---|---|---|---|
| ABC: | 1 | 5,000 | 70 | 70.25 | 3,500 |
| XYZ: | 0.575 | 6,500 | 124 | 124.15 | 3,000 |
| XYZ Ratio-Adjusted Value |  |  | 71.30 | 71.3863 |  |
| Spread Range |  |  | Bid:Ask −1.3863 | Ask:Bid −1.05 |  |

To perform the cross, in Step 301 pair crossing network 5 first determines whether the range of spread limits associated with Arb's and Antiarb's trade requests (i.e., $1.30-$1.19) coincides with the range of the prevailing market spread ($1.3863-$1.05). In this example, the range of spread limits does coincide with the prevailing market spread because at least a portion of the spread limit range overlaps with a portion of the market spread. Thus, a cross can occur.

Next, in Step 302, pair crossing network 5 calculates the mean of Arb's and Antiarb's spread order limit which is ($1.30+$1.19)/2=$1.245 and determines whether the mean is within the range of the market spread (i.e., $1.3863-$1.05). If it is, then in Step 303, pair crossing network 5 calculates the prices at which to cross. The prices must be within the current markets for ABC stock and XYZ stock, and satisfy market uptick requirements (for short sales), and provide a spread that is equal to the spread level calculated above. For example, with the inside market for ABC stock at 70.00-70.25 and the inside market for XYZ stock at 124.00-124.15, a cross price of 70.11 for ABC stock and 124.096 for XYZ stock provides the spread of 1.2452 thereby meeting the requirement of both Arb's and Antiarb's trade request. Finally, in Step 304, pair crossing network 5 crosses 30,000 shares of ABC stock at $70.11 (with Arb buying and Antiarb selling) and 17,200 shares of XYZ at $124.096 (with Arb selling and Antiarb buying).

Once the spread level is determined, the method proceeds to Step 303 in which pair crossing network 5 calculates prices to cross at that are within the current markets for ABC stock and XYZ stock and that meet the calculated spread level. In the case where the calculated spread level is $1.28, the cross will occur at a price of $70.08 for ABC stock and $124.1043 for XYZ stock. Finally, the method proceeds to Step 304 in which pair crossing network 5 performs the cross between Arb and Antiarb.

Once a pair trade request is filled (or partially filled), the transaction details are reported to portfolio manager 9 and made available to the client operating client access device 7.

In the previous example, pair crossing network 5 crosses orders in which both Arb and Antiarb desire to trade the same pair of securities in the same ratio. In an exemplary embodiment, pair crossing network 5 executes a cross between two pair trade requests that are not perfectly matched.

For example, assume that pair crossing network 5 receives the pair trade requests as shown in Table 4. Note that these two pair trade requests are imperfectly matched because each trade request uses a different ratio between ABC and XYZ stock.

TABLE 4

| Investor | Action | Ticker | Ratio | Shares | Action 2 | Ticker | Ratio | Shares | Spread Limit* |
|---|---|---|---|---|---|---|---|---|---|
| Arb | Buy | ABC | 1 | 50,000 | Sell | XYZ | 0.575 | 28,800 | 1.19 credit |
| Antiarb | Sell | ABC | 1 | 30,000 | Buy | XYZ | 0.6 | 18,000 | 4.40 debit |

*Arb's Spread Limit is defined by [0.575 XYZ − ABC].
Antiarb's Spread Limit is defined by [0.6 XYZ − ABC].

Also, assume the market in ABC and XYZ stocks at the time the pair trade requests are received by pair crossing network 5 is as described in Table 5 below.

TABLE 5

|  | Ratio | Bid Size | Bid Price | Ask Price | Ask Size |
|---|---|---|---|---|---|
| ABC: | 1 | 5,000 | 70 | 70.25 | 3,500 |

TABLE 5-continued

|  | Ratio | Bid Size | Bid Price | Ask Price | Ask Size |
|---|---|---|---|---|---|
| XYZ: | 0.575 | 6,500 | 124 | 124.15 | 3,000 |
| Arb's XYZ Ratio-Adjusted Value |  |  | 71 30 | 71 3863 |  |
| Arb's Dollar Range |  |  | Bid:Ask −1.3863 | Ask:Bid −1.05 |  |
| AntiArb's XYZ Ratio-Adjusted Value |  |  | 74 40 | 74.49 |  |
| AntiArb's Dollar Range |  |  | Bid:Ask −4.49 | Ask:Bid −4.15 |  |

Figure 4:
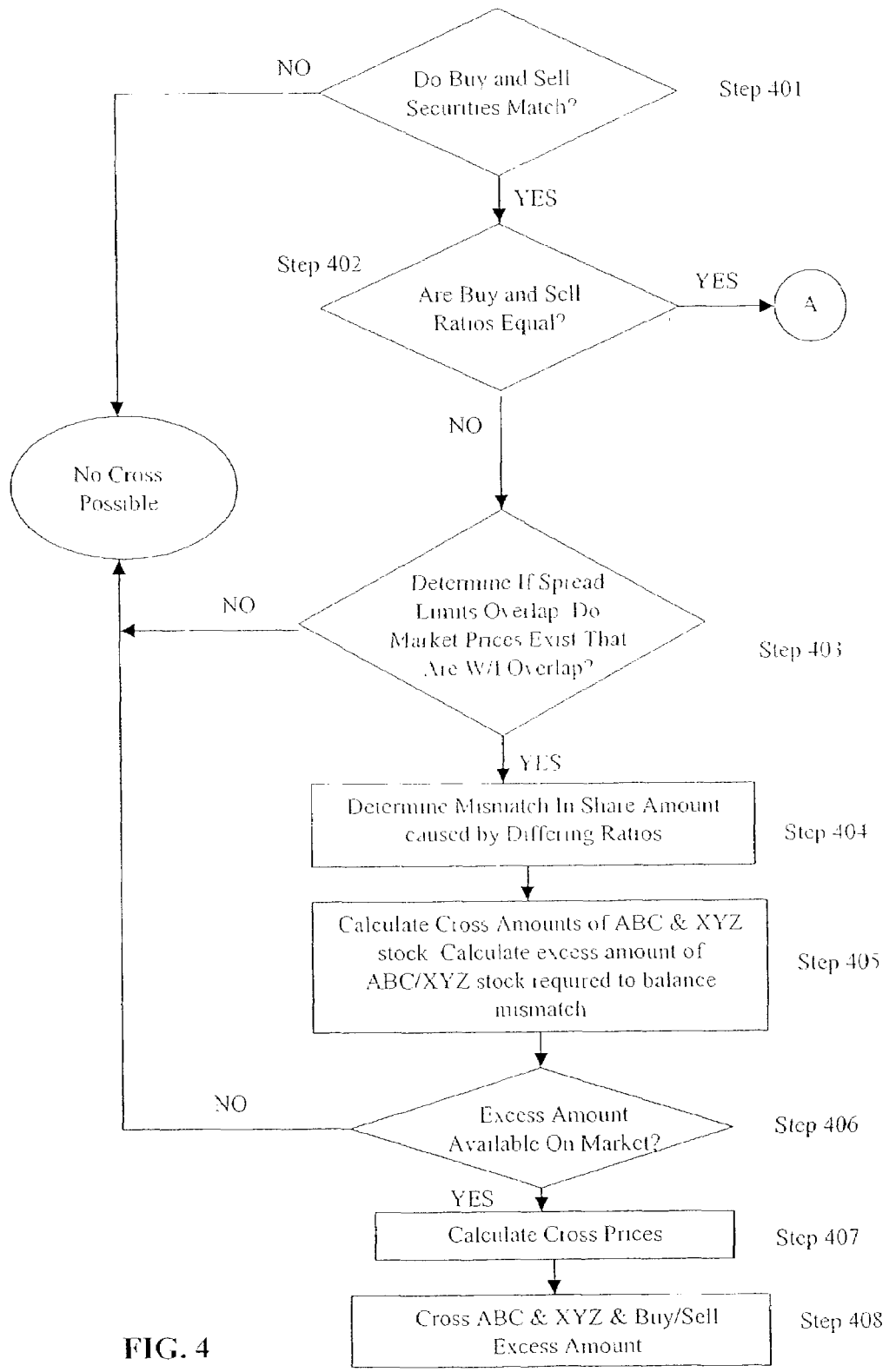
FIG. 4 is a flowchart of a process by which the pair crossing network of the system of FIG. 1 fills imperfectly matched orders.

Referring now to FIG. 4, there is shown a flowchart illustrating a process by which pair crossing network 5 fills these imperfectly matched order. First, in Step 401, pair crossing network 5 determines whether Arb's buy security equals Antiarb's sell security and whether Arb's sell security equals Antiarb's buy security. If both conditions are not met, then a cross between the two orders cannot occur. If the two conditions are met, then in Step 402 it is determined whether Arb's buy ratio equals Antiarb's sell ratio and whether Arb's sell ratio equals Antiarb's buy ratio. If these ratios are the same, then pair crossing network 5 proceeds to cross the two orders as described in the example above. Note that for a cross to occur at this stage does not require the ratios themselves to match but rather that the ratios of the ratios match (for e.g., a ratio of 2:3 matches a ratio of 0.667:1).

If, however, the two ratios are not equal (as in this case where Arb's sell ratio does not equal Antiarb's buy ratio), then in Step 403 pair crossing network determines whether there is an overlap between Arb's and Antiarb's spread limit that also falls within the bid/ask market for ABC and XYZ stock. To make such a determination, pair crossing network 5 calculates whether there are market prices for both ABC and XYZ stock that satisfy the following inequalities:

$$L1 < (RatioA*ABC) - (RatioB*XYZ) \text{ and} \quad (1)$$

$$L2 > (RatioC*ABC) - (RatioD*XYZ) \quad (2)$$

Where L1 is Arb's spread limit of $1.19 credit, L2 is Antiarb's spread limit of $4.40 debit, RatioA is Arb's buy ratio of 1:1, RatioB is Arb's sell ratio of 1:0.575, RatioC is Antiarb's sell ratio of 1:1 and RatioD is Antiarb's buy ratio of 1:0.6.

Figure 5:
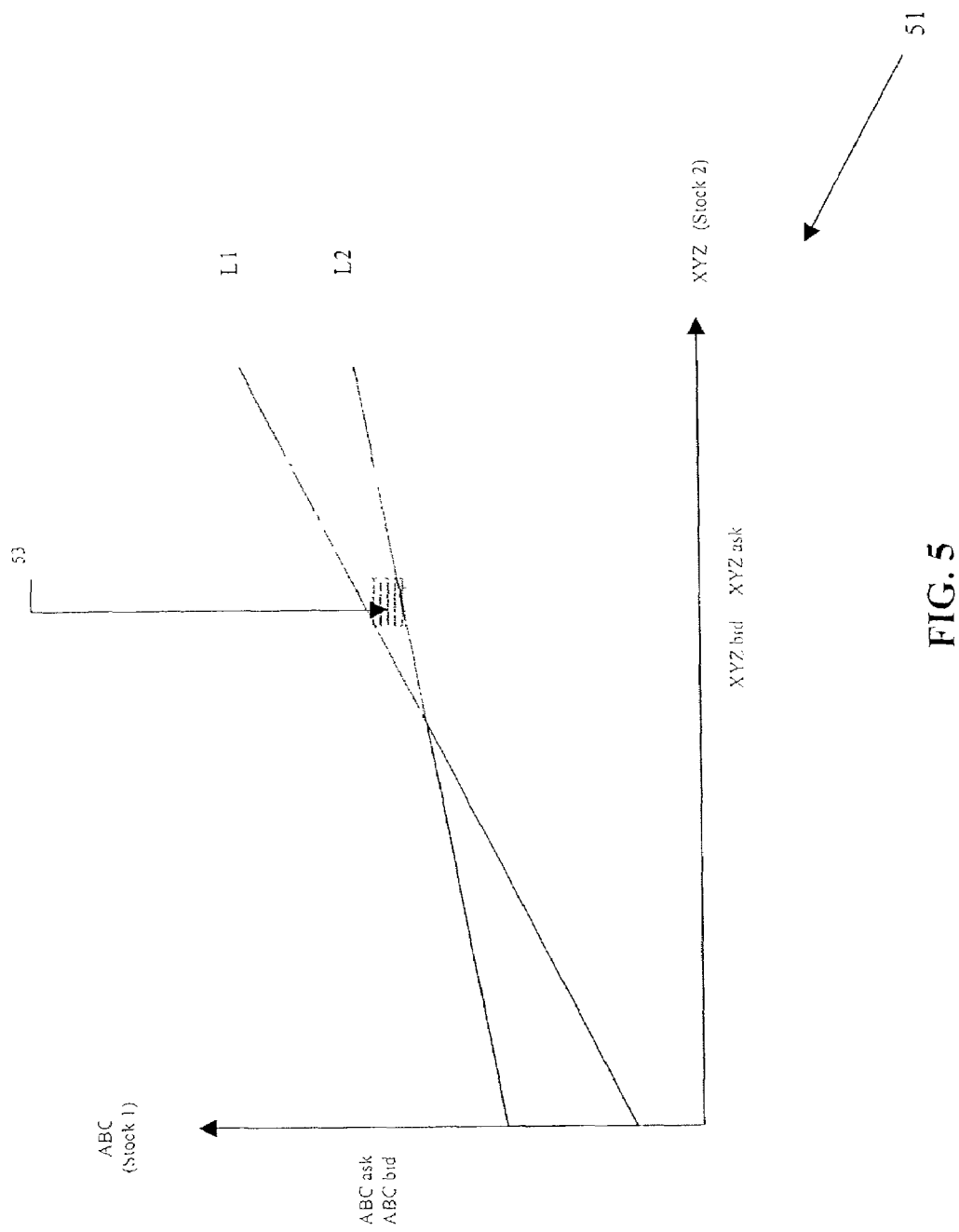
FIG. 5 is a graph for identifying the market prices for two securities that meet the required spread limits.

Referring now to FIG. 5, there is shown a graph 51 that depicts market prices for ABC and XYZ stock that meet the spread limits of Arb and Antiarb. In graph 51, the x-axis represents the prices for XYZ stock while the y-axis represents the prices for ABC stock. Graph 51 includes a shaded area 53 that is the universe of market prices for ABC and XYZ stock that could satisfy the spread trade involving those stocks. Also included in graph 53 is a spreadlimit line L1 (inequality (1), above) that represents the spread limit associated with Arb and a spread limit line L2 (inequality (2), above) that represents the spread limit associated with Antiarb. Thus, the solution set of market prices that satisfies inequalities (1) and (2) is the portion of dark shared area 53 that falls between spread limit line L1 and spread limit line L2. In this example, a cross at a share price for ABC of $70.14 and a share price of $124.15 for XYZ stock meets the investor's spread limits and falls within the market prices for ABC and XYZ stock.

If it is determined that no share prices for both ABC and XYZ stock satisfy Arb's and Antiarb's spread limits, then no cross can occur. If such share prices do exist, then in Step 404, it is determined which of the investors desires to transact in fewer shares of ABC stock and a mismatch in share amounts caused by the differing ratios is determined. In our example, Antiarb desires to sell fewer ABC shares than Arb desires to buy (30,000 vs. 50,000). Then, in Step 405, pair crossing network 5 determines the number of XYZ shares that can be crossed between Arb and Antiarb based on the maximum amount of ABC shares that can be crossed (30,000 in this example). Based on the Antiarb ABC order quantity of 30,000 shares, the maximum number of XYZ shares that Arb will cross with Antiarb is:

$$30,000 * Arb \ XYZ \ Ratio / Arb \ ABC \ Ratio =$$
$$30,000 * 0.575 / 1 = 17,300 (17,250 \text{ rounded to an even lotsize}).$$

While the maximum quantity of XYZ shares that Arb will cross is 17,300, Antiarb's trade request indicates a desire to cross 18,000 shares. To overcome this imbalance, in Step 406, pair crossing network 5 is in communications with external markets 13 for determining whether the excess 700 XYZ shares needed to satisfy Antiarb's trade request can be transacted for in external markets 13. In an exemplary embodiment, pair crossing network 5 makes this determination by issuing a query to pair trading engine 3 as to whether 700 shares of XYZ stock can be bought in external markets 13. Because, as indicated in Table 5, 3,000 shares of XYZ stock are offered at $124.15, pair trading engine 3 responds to pair crossing network 5 that the 700 shares needed to balance the cross between Arb and Antiarb are available from external markets 13 at $124.15.

Next, in Step 407, pair crossing network calculates the cross prices that are necessary such that Arb and Antiarb achieve their respective spread limits while also incorporating the excess 700 shares of XYZ stock that must be purchased from external markets 13 at $124.15 to satisfy Antiarb's trade request. An example of such cross prices that meet these criteria is a price of $70.14 for ABC stock and a price of $124.15 for XYZ stock.

Once the cross prices are calculated, in Step 408, pair crossing network 5 crosses 30,000 shares of ABC stock and 17,300 shares of XYZ stock between Arb and Antiarb and also buys 700 shares of XYZ stock at $124.15 in external markets 13 on behalf of Antiarb. Thus, both Arb and Antiarb's pair trade requests are satisfied.

Alternatively, the entire 18,000 shares of XYZ stock may be crossed thereby fully satisfying Antiarb's trade request. In such a case, the ratio mismatch is addressed by Arb purchasing an additional 1200 (700/0.575 rounded to a lotsize) shares of ABC stock from external market 13 or from firm inventory 11.

Once the trade is completed, the details of the transaction are provided to portfolio manager 9 to report the transaction details to the investors.

In an exemplary embodiment, a pair order (or portion thereof) may be filled against an internal inventory 11 of trade requests maintained by the financial institution operating system 1. For example, in the previous example in which an excess of 700 shares of XYZ stock needs to be purchased in order for a match (i.e., cross) between Arb and Antiarb's trade requests to occur, instead of determining whether the 700 shares are available in external markets 3, pair crossing network 5 examines firm inventory 11 to determine whether the shares are available at the required price. Likewise, in cases where pair trading engine 3 desires to execute a pair trade based on orders to be sent to external markets 13, pair trading engine 3 may first determine whether the order can be filled, in whole or in part, using trade requests pending in firm inventory 11. Generally, the advantages of filling an order using pending trade requests in firm inventory 11 is that execution is faster, transaction costs are lower and leg risk is minimized.

In another exemplary embodiment, a client's pair trade request may also include a minimum number of spreads that can be traded in pair crossing network 5. Also, pair crossing network 5 may be designed to require a minimum share amount for a cross to occur. A minimum number of spreads that can be traded may be provided in order to reduce the distractions and booking costs associated with numerous smaller trades that may exceed the benefits of a de minimis fill.

In another exemplary embodiment, portfolio manager 9 publishes the "inside cross market" for any pair that a client has selected for crossing in pair crossing network 5. In still another exemplary embodiment, the client has the option for each pair trade selected for crossing in pair crossing network 5 to designate that the order should be reflected in the published inside cross market. This inside cross market consists of the tightest spread bid and offer (and corresponding bid size and offer size) from all client pair orders pending in pair crossing network 5. In this way, a client can assess the likelihood and timing of a pair trade request being filled by pair crossing network 5. Also, by publishing the client's spread interest, others seeking liquidity can trade at the client's level.

In an exemplary embodiment, the client can designate each pair order designated for pair trading engine 3 and/or pair crossing network 5 for "Broker Negotiation." If "Broker Negotiation" is designated, the client's broker-dealer sales representative is notified of the client's spread order thereby prompting the broker-dealer to solicit a complementary, agency order from another client. The client may also designate each pair order for "Broker Facilitation" in which case the client allows the broker-dealer to act principally to fill the client's order.

In summary, the advantages to a client of using pair trading engine 3 is that pair trading engine 3 allows the client to trade a spread order while limiting leg risk or the risk of missing a targeted spread level. This is accomplished by breaking the total order into tranches of sizes proportionate to the market, subject to user minimums and maximums, that can be traded in external markets 13 or against firm inventory 11. Orders executed via pair trading engine 3, however, are typically of a lower traded volume because trading is constrained to the liquidity available in the market. In contrast, trades executed via pair crossing network 5 are not constrained by market liquidity and do not have to be tranched to minimize leg risk. In particular, the benefits of filling a pair trade request via pair crossing network 5 are as follows:

Elimination of Leg Risk. Pair crossing network 5 potentially provides a deeper well of liquidity because the trades are brokered, as a spread, directly between spread investors via a central clearing facility. Moreover, the introduction and use of a pair trading facility eliminates the 'leg' risk described above without a sacrifice of liquidity.

Large Transactions Only. Certain large investors may prefer to use pair crossing network 5 rather than pair trading engine 3 to avoid having a trade request broken up into numerous small executions. For example, sudden, brief moves in one of the two stocks included in the pair trade request may cause pair trading engine 3 to issue numerous small executions to fill the request. While a small investor may welcome capturing these small opportunities, a large investor may find such small executions to be more of a nuisance than a service.

Price Setting versus Price Taking. Large investors seeking liquidity may prefer to 'set' their price via the pair crossing network 5. Also, other spread investors looking for liquidity can use pair crossing network 5 to monitor and trade with the large investor at the large investor's level. While client orders directed to pair trading engine 3 can designate a spread limit, such orders are essentially "price-takers"—as the market reaches the desired level, the orders are executed. Moreover, the pair trading engine tranching mechanism creates relatively small orders, allowing institutional flows to move the individual stocks. As a result, the small, tranched orders generated by pair trading engine 3 can become 'overpowered' by single-name institutional flows. In addition, orders designated solely for pair trading engine 3, and not for pair crossing network 5, are not published to a central quote facility (such as by portfolio manager 9) thereby preventing other spread traders from knowing the size and limit of a pair trading engine order.

Illiquid Stocks vs Liquid Stocks. Spreads that include one or two illiquid stocks are difficult to fill using pair trading engine 3 alone. Because illiquid stocks often demonstrate small bid and ask sizes and wide bid-ask spreads, pair trading engine 3 will typically only issue market orders having small quantities (subject to user minimums and maximums) that presents the client with greater leg risk from mid-trade changes in the bid-ask prices. In contrast, orders routed to price crossing network 5 are not confined by liquidity in the market place thereby allowing large crosses between spread traders in illiquid spreads.

Accordingly, a system and method for trading pair securities is provided in which the client receives the benefits of having a pair order filled by either pair trading engine 3, pair crossing network 5 or a combination of both.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Access devices can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computer implemented method for fulfilling a pair trade request, comprising the steps of:
    receiving a plurality of pair trade requests, comprising one pair trade request and another pair trade request, wherein each pair trade request comprises a request to trade a first security, a request to trade a second security, and a request to trade said first security and said second security with a minimum spread limit, and wherein said first security and said second security each have a bid price and an ask price;
    determining the bid/bid spread in the market of said first security and said second security;
    determining the ask/ask spread in the market of said first security and said second security;
    determining that the minimum spread limit of each pair trade request is met by a range of said bid/bid spread and said ask/ask spread;
    executing a transaction between a first portion of the trade of said first security in said one pair trade request and at least one non-pair trade request, provided that the minimum spread limit of said one pair trade request is met by said range of said bid/bid spread and said ask/ask spread; and
    matching, using a computer, a second portion of said trade of said first security in said one pair trade request and at least a first portion of the trade of said second security in said one pair trade request against said another pair trade request, provided that a range of the minimum spread limit of said one pair trade request and said another pair trade request overlaps with said range of said bid/bid spread and said ask/ask spread.

2. The method of claim 1, wherein the step of executing a transaction for said first portion of the trade of said first security in said one pair trade request includes the step of:
    executing a transaction for said first portion of the trade of said first security in said one pair trade request in an external market.

3. The method of claim 1, wherein the step of executing a transaction is performed by a financial institution having an order inventory and the step of executing a transaction includes the step of:
    executing a transaction for said first portion of the trade of said first security in said one pair trade request against said order inventory.

4. The method of claim 1, further comprising:
    executing a transaction between a second portion of the trade of said second security in said one pair trade request and at least another non-pair trade request, provided that the minimum spread limit of said one pair trade request is met by said range of said bid/bid spread and said ask/ask spread, and wherein the step of executing said first portion of said one pair trade request and executing said second portion of said one pair trade request includes the steps of:
    determining whether the bid price of the first security and the bid price of the second security meet a spread limit;
    determining an amount of the second security that can be sold based on a bid size associated with the second security;
    calculating an equivalent amount of said first security that can be bought based on the amount of said second security that can be sold;
    adjusting said equivalent amount of said first security based on adjustment criteria;
    calculating a purchase price for said adjusted equivalent amount of said first security based on the spread limit;
    executing an initiating order to buy said adjusted equivalent amount of said first security at said purchase price; and
    executing a covering order to sell said amount of the second security.

5. The method of claim 4, wherein the step of executing a covering order to sell includes the step of:
    executing a covering order to sell said amount of the second security at the bid price of the second security.

6. The method of claim 4, further comprising the steps of:
    determining whether the ask price of the first security and the ask price of the second security meet a spread limit;
    determining an amount of the first security that can be bought based on an offer size associated with the first security;
    calculating an equivalent amount of said second security that can be sold based on the amount of the second security that can be bought;
    adjusting said equivalent amount of said second security based on adjustment criteria;
    calculating a selling price for said adjusted equivalent amount of said second security based on the spread limit;
    executing an initiating order to sell said adjusted equivalent amount of said second security at said selling price; and
    executing a covering order to purchase said amount of the first security.

7. The method of claim 6, wherein the step of executing a covering order to purchase includes the step of:
    executing a covering order to purchase said amount of the first security at the ask price of the first security.

8. The method of claim 6, wherein said adjustment criteria include a minimum amount and a maximum amount.

9. The method of claim 8, wherein the step of executing an initiating order includes the step of:
rounding said initiating order to a round lot size.

10. The method of claim 1, wherein the step of executing a first portion of the trade of said first security in said one pair trade request includes the step of:
executing a first portion of the trade of said first security in said one pair trade request in a plurality of tranches.

11. The method of claim 1, wherein said one pair trade request has a first spread limit and said another pair trade request has a second spread limit and wherein said step of matching said second portion of said trade of said first security in said one pair trade request and at least a first portion of the trade of said second security in said one pair trade request against said another pair trade request further includes the steps of:
determining that a range of said first spread limit and said second spread limit overlaps with a market spread;
setting a spread level;
calculating prices for the first security and the second security that are within the market spread and based on said spread level; and
matching said second portion of said trade of said first security in said one pair trade request and at least a first portion of the trade of said second security in said one pair trade request against said another pair trade request based on said calculated prices.

12. The method of claim 11, wherein the step of setting a spread level includes the steps of:
calculating a mean between said first spread limit and said second spread limit; and
setting said spread level as said mean if said mean is within said market spread.

13. The method of claim 12, further including the step of:
identifying a spread amount that is closest to said mean and within said market spread; and
setting said spread level as said spread amount if said mean is not within said market spread.

14. The method of claim 1, wherein said one pair trade request has a first spread limit, a buy ratio and a sell ratio, said another pair trade request has a second spread limit, a buy ratio and a sell ratio and wherein the step of matching a second portion of said trade of said first security in said one pair trade request and at least said first portion of the trade of said second security in said one pair trade request against said another pair trade request further includes the steps of:
determining that said buy ratio and said sell ratio associated with said one trade request does not equal said buy ratio and said sell ratio of said another pair trade request and that an overlap exists between the range of said first spread limit and said second spread limit and a market spread;
determining that market prices exist that are within the overlap;
determining a mismatch amount in said second security based on a difference between said buy ratio and said sell ratio associated with said one pair trade request and said buy ratio and said sell ratio of said another pair trade request;
calculating a cross amount for said first security and said second security;
selecting a crossing price for said first security and said second security that is within said overlap;
determining that said mismatch amount is available at said crossing price for said second security;
matching said second portion of said trade of said first security in said one pair trade request and at least said first portion of the trade of said second security in said one pair trade request against said another pair trade request based on said selected prices; and
executing a transaction for said mismatch amount of said second security at said crossing price for said second security.

15. The method of claim 14, wherein the step of determining that said mismatch amount is available at said crossing price for said second security includes the step of:
determining that said mismatch amount is available in an external market at said crossing price for said second security.

16. The method of claim 14, wherein the step of determining that said mismatch amount is available is performed by a financial institution having an order inventory and the step of determining that said mismatch amount is available at said crossing price for said second security includes the step of:
determining that said mismatch amount is available in said order inventory at said crossing price for said second security.

17. The method of claim 1, wherein said one pair trade request and said another pair trade request indicate a number of spreads and wherein the step of matching a second portion of said trade of said first security in said one pair trade request and at least said first portion of the trade of said second security in said one pair trade request against said another pair trade request, includes the step of:
matching a second portion of said trade of said first security in said one pair trade request and at least said first portion of the trade of said second security in said one pair trade request against said another pair trade request if said number of spreads is greater than a minimum number of spreads.

18. The method of claim 1, including the step of:
receiving a preference for filling at least some of said plurality of trade requests via said executing step.

19. The method of claim 1, including the step of:
receiving a preference for filling at least some of said plurality of trade requests via said matching step.

20. The method of claim 1, wherein a client submits a query regarding a status of said pair trade request and the status of said pair trade request is continuously updated in real time.

21. The method of claim 19, wherein said preference is submitted by a client electronically.

22. The method of claim 1, wherein a client receives a simultaneous report when said pair trade request is filled and the client confirms said pair trade electronically.

23. The method of claim 1, further comprising:
executing a transaction between a second portion of the trade of said second security in said one pair trade request and at least another non-pair trade request, provided that the minimum spread limit of said one pair trade request is met by said range of said bid/bid spread and said ask/ask spread, and wherein the step of executing said first portion of said one pair trade request and executing said second portion of said one pair trade request includes the step of:
determining whether the ask price of the first security and the ask price of the second security meet a spread limit;
determining an amount of the second security that can be bought based on an ask size associated with the second security;
calculating an equivalent amount of said first security that can be sold based on the amount of the second security that can be bought;
adjusting said equivalent amount of said first security based on adjustment criteria;

calculating a selling price for said adjusted equivalent amount of said first security based on the spread limit;

executing an initiating order to sell said adjusted equivalent amount of said first security at said selling price; and executing a covering order to purchase said amount of said second security.

24. A system for fulfilling a pair trade request, said system receiving a plurality of pair trade requests, comprising one pair trade request and another pair trade request, wherein each pair trade request comprises a request to trade a first security, a request to trade a second security, and a request to trade said first security and said second security with a minimum spread limit, and wherein said first security and said second security each have a bid price and an ask price, comprising:

a pair trading engine for:

determining the bid/bid spread in the market of said first security and said second security;

determining the ask/ask spread in the market of said first security and said second security;

determining that the minimum spread limit of each pair trade request is met by a range of said bid/bid spread and said ask/ask spread for every security;

executing a transaction between a first portion of the trade of said first security in said one pair trade request and at least one non-pair trade request, provided that the minimum spread limit of said one pair trade request is met by said range of said bid/bid spread and said ask/ask spread; and a pair crossing network for matching a second portion of said trade of said first security in said one pair trade request and at least a first portion of the trade of said second security in said one pair trade request against said another pair trade request, provided that a range of the minimum spread limit of said one pair trade request and said another pair trade request overlaps with said range of said bid/bid spread and said ask/ask spread.

25. The system of claim 24, further comprising a link to an external market wherein said pair trading engine forwards said transaction for said first portion of the trade of said first security in said one pair trade request for execution in said external market via said link.

26. The system of claim 24, further comprising a financial institution having an order inventory and wherein said pair trading engine executes said transaction for said first portion of the trade of said first security in said one pair trade request against said order inventory.

27. The system of claim 24, wherein said pair trading engine determines whether the bid price of the first security in said one pair trade request and the bid price of the second security in said one pair trade request meet a spread limit; determines an amount of the second security that can be sold based on a bid size associated with the second security; calculates an equivalent amount of said first security that can be bought based on the amount of said second security that can be sold; adjusts said equivalent amount of said first security based on adjustment criteria; calculates a purchase price for said adjusted equivalent amount of said first security based on the spread limit; executes an initiating order to buy said adjusted equivalent amount of said first security at said purchase price; and executes a covering order to sell said amount of the second security.

28. The system of claim 27, wherein the pair trading engine executes a covering order to sell said amount of the second security at the bid price of the second security.

29. The system of claim 27, wherein the pair trading engine determines whether the ask price of the first security and the ask price of the second security meet a spread limit; determines an amount of the first security that can be bought based on an offer size associated with the first security; calculates an equivalent amount of said second security that can be sold based on the amount of the second security that can be bought; adjusts said equivalent amount of said second security based on adjustment criteria; calculates a selling price for said adjusted equivalent amount of said second security based on the spread limit; executes an initiating order to sell said adjusted equivalent amount of said second security at said selling price; and executes a covering order to purchase said amount of the first security.

30. The system of claim 29, wherein the pair trading engine executes a covering order to purchase said amount of the first security at the ask price of the first security.

31. The system of claim 27, wherein said adjustment criteria include a minimum amount and a maximum amount.

32. The system of claim 31, wherein the pair trading engine rounds said initiating order to a round lot size.

33. The system of claim 24, wherein the pair trading engine executes at least a portion of the trade of one of said securities in one of said pair trade requests in a plurality of tranches.

34. The system of claim 24, wherein said one pair trade request has a first spread limit and said another pair trade request has a second spread limit and wherein the pair crossing network determines that a range of said first spread limit and said second spread limit overlaps with a market spread; sets a spread level; calculates prices for the first security and the second security that are within the market spread and based on said spread level; and matches said second portion of said trade of said first security in said one pair trade request and at least a first portion of the trade of said second security in said one pair trade request against another of said plurality of pair trade request based on said calculated prices.

35. The system of claim 34, wherein the pair crossing network calculates a mean between said first spread limit and said second spread limit and sets said spread level as said mean if said mean is within said market spread.

36. The system of claim 35, wherein the pair crossing network identifies a spread amount that is closest to said mean and within said market spread and sets said spread level as said spread amount if said mean is not within said market spread.

37. The system of claim 24, wherein said one pair trade request has a first spread limit, a buy ratio and a sell ratio, said another pair trade request has a second spread limit, a buy ratio and a sell ratio and wherein the pair crossing network determines that said buy ratio and said sell ratio associated with said one pair trade request does not equal said buy ratio and said sell ratio of said another pair trade request and that an overlap exists between the range of said first spread limit and said second spread limit and a market spread; determines that market prices exist that are within the overlap; determines a mismatch amount in said second security based on a difference between said buy ratio and said sell ratio associated with said one pair trade request and said buy ratio and said sell ratio of said another pair trade request; calculates a cross amount for said first security and said second security; selects a crossing price for said first security and said second security that is within said overlap; determines that said mismatch amount is available at said crossing price for said second security; matches said second portion of said trade of said first security in said one pair trade request and at least said first portion of the trade of said second security in said one pair trade request against said another pair trade request based on said selected prices; and executes a transaction for said mismatch amount of said second security at said crossing price for said second security.

38. The system of claim 37, wherein the pair crossing network determines that said mismatch amount is available in an external market at said crossing price for said second security.

39. The system of claim 37, wherein the pair crossing network determines that said mismatch amount is available at said crossing price for said second security in said an order inventory of a financial institution.

40. The system of claim 24, wherein said one pair trade request and said another pair trade request indicate a number of spreads and wherein the pair crossing network matches said second portion of said trade of said first security in said one pair trade request and at least said first portion of the trade of said second security in said one pair trade request against said another pair trade request if said number of spreads is greater than a minimum number of spreads.

41. The system of claim 24, wherein said plurality of pair trade requests include at least some pair trade requests indicating a preference for execution via said pair crossing network, said system further comprising a portfolio manager in communications with said pair crossing network, said portfolio manager receiving said plurality of pair trade requests and routing said at least some of said plurality of trade requests to said pair crossing network according to said preference.

42. The system of claim 24, said system further comprising a pair trading engine for executing at least some of said plurality of pair trade requests, said system further comprising a portfolio manager in communications with said pair trading engine, wherein said plurality of pair trade requests include at least some pair trade requests indicating a preference for execution via said pair trading engine, said portfolio manager receiving said plurality of pair trade requests and routing said at least some of said plurality of trade requests to said pair trading engine according to said preference.

43. The method of claim 24, wherein a client submits a query regarding a status of said pair trade request and the status of said pair trade request is continuously updated in real time.

44. The method of claim 41, wherein said preference is submitted by a client electronically.

45. The method of claim 24, wherein a client receives a simultaneous report when said pair trade request is filled and the client confirms said pair trade electronically.

46. A computer readable storage medium storing instructions for fulfilling a pair trade request that, when executed by a computer, cause to computer to:

receive a plurality of pair trade requests, comprising one pair trade request and another pair trade request, wherein each pair trade request comprises a request to trade a first security, a request to trade a second security, and a request to trade said first security and said second security with a minimum spread limit, and wherein said first security and said second security each have a bid price and an ask price;

determine the bid/bid spread in the market of said first security and said second security;

determine the ask/ask spread in the market of said first security and said second security;

determine that the minimum spread limit of each pair trade request is met by a range of said bid/bid spread and said ask/ask spread;

execute a transaction between a first portion of the trade of said first security in said one pair trade request and at least one non-pair trade request, provided that the minimum spread limit of said one pair trade request is met by the range of said bid/bid spread and said ask/ask spread; and match a second portion of said trade of said first security in said one pair trade request and at least a first portion of the trade of said second security in said one pair trade request against said another pair trade request, provided that a range of the minimum spread limit of said one pair trade request and said another pair trade request overlaps with said range of said bid/bid spread and said ask/ask spread.

* * * * *